US007206815B1

(12) United States Patent
Boyer et al.

(10) Patent No.: US 7,206,815 B1
(45) Date of Patent: *Apr. 17, 2007

(54) METHOD AND APPARATUS FOR SYNCHRONIZING AN EMAIL CLIENT ON A PORTABLE COMPUTER SYSTEM WITH AN EMAIL CLIENT ON A DESKTOP COMPUTER

(75) Inventors: Monty Boyer, Saratoga, CA (US); Joseph Sipher, Sunnyvale, CA (US)

(73) Assignee: Palmsource Inc., Sunnyvale, CA (US)

( * ) Notice: Subject to any disclaimer, the term of this patent is extended or adjusted under 35 U.S.C. 154(b) by 423 days.

This patent is subject to a terminal disclaimer.

(21) Appl. No.: 10/758,980

(22) Filed: Jan. 16, 2004

Related U.S. Application Data

(63) Continuation of application No. 10/132,031, filed on Apr. 24, 2002, now Pat. No. 6,711,609, which is a continuation of application No. 08/790,622, filed on Jan. 29, 1997, now Pat. No. 6,401,112.

(51) Int. Cl.
*G06F 13/00* (2006.01)
(52) U.S. Cl. ...................................... 709/206; 707/201
(58) Field of Classification Search ................ 709/206; 707/201, 203, 200, 10
See application file for complete search history.

(56) References Cited

U.S. PATENT DOCUMENTS

| | | |
|---|---|---|
| 4,432,057 A | 2/1984 | Daniell |
| 4,807,182 A | 2/1989 | Queen |
| 4,866,611 A | 9/1989 | Cree et al. |
| 4,875,159 A | 10/1989 | Cary et al. |
| 4,956,809 A | 9/1990 | George et al. |
| 5,001,628 A | 3/1991 | Johnson et al. |
| 5,065,360 A | 11/1991 | Kelly |
| 5,124,909 A | 6/1992 | Blakely et al. |
| 5,142,619 A | 8/1992 | Webster, III |
| 5,159,592 A | 10/1992 | Perkins |
| 5,187,787 A | 2/1993 | Skeen et al. |
| 5,210,868 A | 5/1993 | Shimada et al. |
| 5,237,678 A | 8/1993 | Kuechler et al. |

(Continued)

OTHER PUBLICATIONS

Newton: Message Pad Handbook, Apple Computer, Inc., Chapter 4 "Reference" and "Appendix B—NewtonMail Setup and Access Numbers", pp. 102-109 and pp. 181-185.

(Continued)

*Primary Examiner*—Kenneth R. Coutler
(74) *Attorney, Agent, or Firm*—Hickman Palermo Truong & Becker LLP

(57) ABSTRACT

A fully integrated email system for a desktop computer with an associated palmtop computer is disclosed. The portable computer has an email client for viewing incoming email messages and composing outgoing email messages. The personal computer has an email synchronization conduit that synchronizes email on the portable computer email client with email for the desktop computer system. The email synchronization conduit ensures that the email state on the portable computer system matches the email state on the desktop personal computer system exactly. Thus, if an email message is deleted on the portable computer system then that email message will be deleted from the desktop personal computer system. Similarly, if an email message is deleted on the desktop personal computer system then that email message will be deleted from the portable computer system.

35 Claims, 5 Drawing Sheets

U.S. PATENT DOCUMENTS

| | | |
|---|---|---|
| 5,251,291 A | 10/1993 | Malcolm |
| 5,261,045 A | 11/1993 | Scully et al. |
| 5,261,094 A | 11/1993 | Everson et al. |
| 5,272,628 A | 12/1993 | Koss |
| 5,283,887 A | 2/1994 | Zachary |
| 5,301,313 A | 4/1994 | Terada et al. |
| 5,315,709 A | 5/1994 | Alston, Jr. et al. |
| 5,327,555 A | 7/1994 | Anderson |
| 5,333,252 A | 7/1994 | Brewer, III et al. |
| 5,333,266 A * | 7/1994 | Boaz et al. .................. 709/206 |
| 5,339,392 A | 8/1994 | Risberg et al. |
| 5,339,434 A | 8/1994 | Rusis |
| 5,355,476 A | 10/1994 | Fukumura |
| 5,379,057 A | 1/1995 | Clough et al. |
| 5,392,390 A | 2/1995 | Crozier |
| 5,434,994 A | 7/1995 | Shaheen et al. |
| 5,463,772 A | 10/1995 | Thompson et al. |
| 5,475,833 A | 12/1995 | Dauerer et al. |
| 5,519,606 A | 5/1996 | Frid-Nielsen et al. |
| 5,537,592 A | 7/1996 | King et al. |
| 5,544,356 A | 8/1996 | Robinson et al. |
| 5,546,539 A | 8/1996 | Poling |
| 5,566,069 A | 10/1996 | Clark, Jr. et al. |
| 5,572,528 A | 11/1996 | Shuen |
| 5,574,859 A | 11/1996 | Yeh |
| 5,592,669 A | 1/1997 | Robinson et al. |
| 5,598,536 A | 1/1997 | Slaughter, III et al. |
| 5,630,081 A | 5/1997 | Rybicki et al. |
| 5,647,002 A | 7/1997 | Brunson |
| 5,649,195 A | 7/1997 | Scott et al. |
| 5,666,362 A | 9/1997 | Chen et al. |
| 5,666,530 A | 9/1997 | Clark et al. |
| 5,666,553 A | 9/1997 | Crozier |
| 5,684,990 A | 11/1997 | Boothby |
| 5,696,702 A | 12/1997 | Skinner et al. |
| 5,701,423 A | 12/1997 | Crozier |
| 5,706,509 A | 1/1998 | Man-Hak Tso |
| 5,710,922 A | 1/1998 | Alley et al. |
| 5,727,159 A | 3/1998 | Kikinis |
| 5,727,202 A | 3/1998 | Kucala |
| 5,729,452 A | 3/1998 | Smith et al. |
| 5,742,820 A | 4/1998 | Perlman et al. |
| 5,758,354 A | 5/1998 | Huang et al. |
| 5,761,439 A | 6/1998 | Kar et al. |
| 5,845,282 A | 12/1998 | Alley et al. |
| 5,857,201 A | 1/1999 | Wright, Jr. et al. |
| 5,864,604 A | 1/1999 | Moen et al. |
| 5,867,821 A | 2/1999 | Ballantyne et al. |
| 5,948,059 A | 9/1999 | Woo et al. |
| 5,951,638 A | 9/1999 | Hoss et al. |
| 5,961,590 A | 10/1999 | Mendez et al. |
| 5,966,714 A | 10/1999 | Huang et al. |
| 6,006,274 A | 12/1999 | Hawkins et al. |
| 6,018,762 A | 1/2000 | Brunson et al. |
| 6,052,735 A | 4/2000 | Ulrich et al. |
| 6,275,831 B1 | 8/2001 | Bodnar et al. |
| 6,401,112 B1 | 6/2002 | Boyer et al. |
| 6,711,609 B2 * | 3/2004 | Boyer et al. ................. 709/206 |

OTHER PUBLICATIONS

Chris O'Malley; Getting in Sync Using PowerSync; Computer Shopper Magazine, Feb. 1997.

Zahn, et al., Network Computing Architecture, pp. 1-11, 19/31, 87-115, 117-133, 187-199, 201-209 (1990).

IntelliLink Brochure (1990).

Madnick, S. et al., "Logical Connectivity: Applications, Requirements, Architecture, and Research Agenda," MIT, System Sciences, 1991, Hawaii Int'l, vol. 1, IEEE, Jun. 1991.

Dayton, D., "FRx extends reporting power of Platinum Series: (IBM Desktop Software's line of accounting software)," PC Week, V. 8, No. 5, p. 29(2), Feb. 1991.

Cobb, et al., "Paradox 3.5 Handbook 3rd Edition," Bantam (1991), pp. 803-816.

Alfieri, "The Best Book of: WordPerfect Version 5.0," Hayden Books (1998), pp. 153-165 and 429-435.

User Manual for PC-Link for the B.O.S.S., Traveling Software, Inc. (1989).

User Manual for Connectivity Pack for the HP 95LX, Hewlett Packard Company (1991).

Organizer LinkII Operational Manual, Sharp Electronics Corporation, No. Date.

"Open Network Computing—Technical Overview," Sun Technical Report, Sun Microsystems, Inc., pp. 1-32 (1990).

Excerpt from Microsoft Windows 95 Documentation, (3) pages.

Excerpt from LapLink World Wide Web for SpeedSync, (1) page total.

* cited by examiner

METHOD AND APPARATUS FOR SYNCHRONIZING AN EMAIL CLIENT ON A PORTABLE COMPUTER SYSTEM WITH AN EMAIL CLIENT ON A DESKTOP COMPUTER

This application claims the benefit of priority and is a continuation of each of the following previously filed patent applications: U.S. patent application Ser. No. 10/132,031, entitled "Method and Apparatus for Synchronizing an E-mail Client on a Portable Computer System with an E-mail Client on a Desktop Computer", filed Apr. 24, 2002 now U.S. Pat. No. 6,711,609 and incorporated herein by reference, which is a continuation of U.S. patent application Ser. No. 08/790,622, entitled "Method and Apparatus for Synchronizing an Email Client on a Portable Computer System with an Email Client on a Desktop Computer", filed on Jan. 29, 1997 and issued as U.S. Pat. No. 6,401,112 on Jun. 4, 2002, the contents of which are incorporated herein by reference.

FIELD OF THE INVENTION

The present invention relates to the field of portable computers systems. Specifically, the present invention discloses a systems for synchronizing an email client on a portable computer system with an email client on a desktop computer system.

BACKGROUND OF THE INVENTION

Personal computer systems have become common tools in modern society. One of the most important uses for personal computers is electronic mail (email). Personal computer users use email to send notes and computer files to other computer users.

Many personal computer users also use small portable palmtop computer systems such that the personal computer user can carry important personal information. To store the important personal information, palmtop computer systems usually provide Personal Information Management (PIM) applications such as an address book, a daily organizer, and a To-Do list applications.

In addition to the Personal Information Management (PIM) applications, it would be desirable to have an email application on the palmtop computer system. The email application would allow the user to send and receive email messages using the palmtop computer system.

Although an email application on palmtop computer system would be very useful, such an application can create problems. For example, would incoming email arrive on the desktop personal computer system, the portable computer system or both? Furthermore, if the user deleted an email message on one of the two computer systems, should that email message appear on the other computer system? Thus, it would be desirable to have an email application for a palmtop computer system that is completely in synchronization with an email application on a desktop personal computer system.

SUMMARY AND OBJECTS OF THE INVENTION

It is therefore an object of the present invention to provide a palmtop computer system that is fully integrated with common email systems used by desktop personal computers. To accomplish this goal, the present invention introduces an email client for the portable computer system and an email synchronization conduit for a desktop personal computer system.

The email client for the portable computer system allows the user to view incoming email messages. The email client on the portable computer system also allows the user to compose outgoing email messages.

The email synchronization conduit on the desktop personal computer system is responsible for synchronizing the state of the portable computer email client with an email client on a personal computer system. After a synchronization event, the email synchronization conduit ensures that the email state on the portable computer system exactly matches the email state on the desktop personal computer system. For example, if an email message is deleted on email client of the portable computer system then a matching copy of that email message will be deleted from the desktop personal computer system. Similarly, if an email message is deleted on the email client of the desktop personal computer system then that email message will be deleted from the portable computer system. By keeping the email state of the two different computer systems in exact synchronization, the user can switch between the email client on the portable computer system and the email client on the desktop personal computer system without missing a message or reading a redundant message.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

Methods and apparatus for implementing a palmtop computer system that is well integrated with a personal computer system is disclosed. In the following description, for purposes of explanation, specific nomenclature is set forth to provide a thorough understanding of the present invention. However, it will be apparent to one skilled in the art that these specific details are not required to practice the present invention. In other instances, well-known circuits and devices are shown in block diagram form to avoid obscuring the present invention.

Basic Synchronization

Figure 1A:
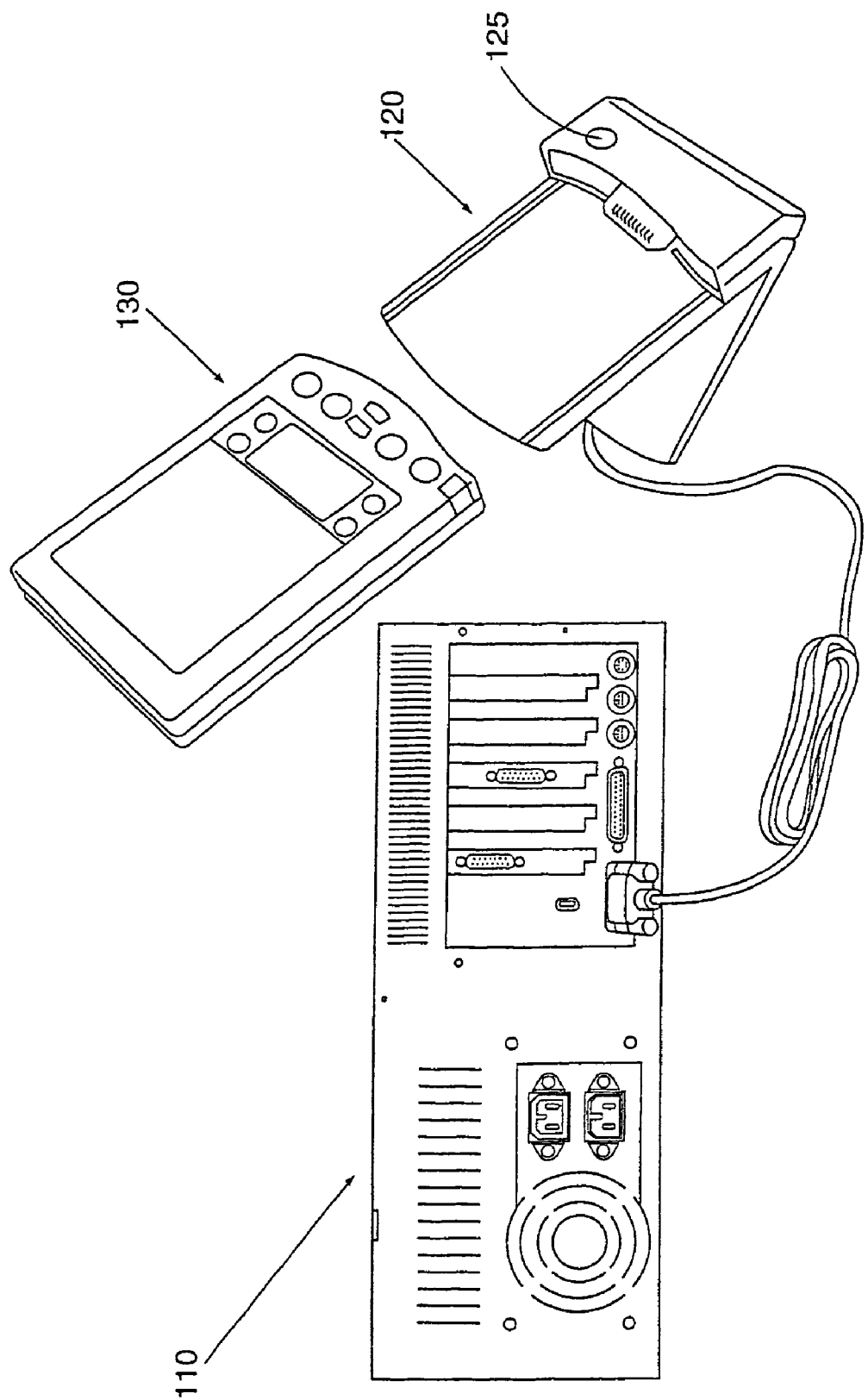
FIG. 1a illustrates a portable computer system and a personal computer system equipped with a cradle for synchronizing with the portable computer system.

FIG. 1a illustrates a portable computer system 130 that communicates and synchronizes information with a personal computer system 110. To synchronize the information in the two computer systems, a user places the portable computer system 130 into the cradle 120 and presses synchronization button 125. The synchronization button 125 activates a synchronization program on the portable computer system 130. The synchronization program on the portable computer system 130 communicates with a peer synchronization program on the personal computer system 110. The two synchronization programs synchronize the information on the two computer systems.

Figure 1B:
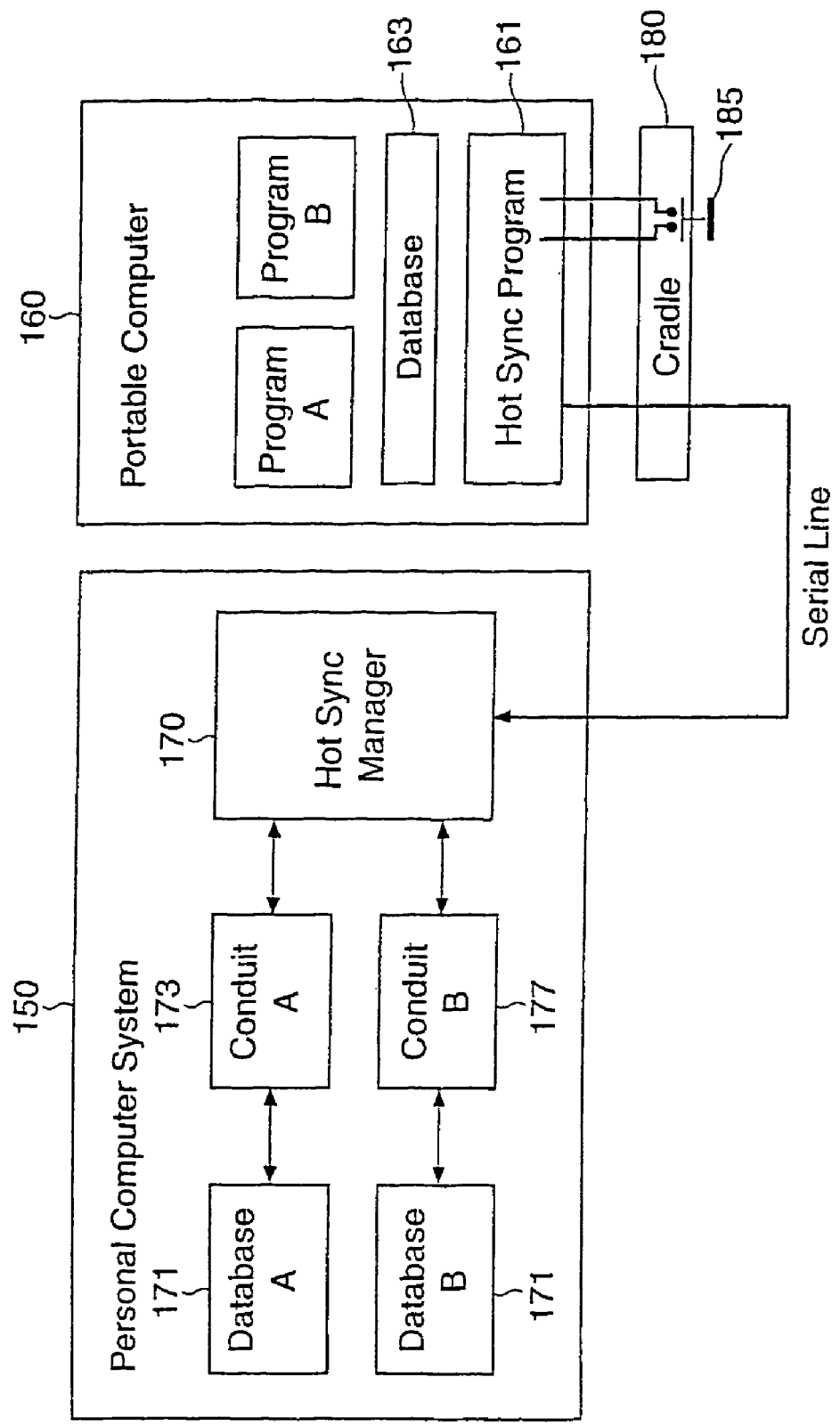
FIG. 1b illustrates a block diagram that depicts the software architecture for synchronizing information on the portable computer system with information on a desktop personal computer system.

FIG. 1b illustrates a block diagram of the software components that perform the synchronization of the two computer systems. In FIG. 1b, the portable computer 160 has two different programs, program A and program B, that execute on the portable computer 160. Program A and program B use a common database 163 to store their data.

Referring to FIG. 1b, a synchronization cradle 180 is illustrated below the portable computer 160. The synchronization cradle 180 has a button 185 that activates a synchronization Program (HotSync) 161 in the portable computer system 160. When activated, the HotSync Program 161 communicates with the peer synchronization program (HotSync Manager) 170 in the personal computer 150. The HotSync Manager 170 operates by executing a series of conduit programs such as conduit program A and conduit program B illustrated in FIG. 1b. Each conduit program is used to synchronize the information associated with a particular program on the portable computer system. Conduit programs can also perform additional tasks such as software installation. A full description of the synchronization architecture can be found in the U.S. patent application entitled "Extendible Method and Apparatus for Synchronizing Multiple Files On Two Different Computer Systems" having Ser. No. 08/542,055, filed on Oct. 13, 1995 now U.S. Pat. No. 5,884,323.

In FIG. 1b, conduit program A and conduit program B are used to synchronize the data for application program A and application program B on the portable computer 160 respectively. The HotSync Manager 170 communicates with the HotSync Program 161 in order to access the database 163 on the portable computer 160. The necessary records from of the database 163 are copied to the personal computer such that the conduit programs on the personal computer can process the records. In the example of FIG. 1b, the records from database 163 that are associated with application program A and application program B are copied into the personal computer and then reconciled with databases A and database B by conduit A and conduit B respectively. After the records have been synchronized, the synchronized records are written back to the database 163 on the portable computer system 160.

Email Synchronization

Synchronizing email information is not as simple as synchronizing a simple database such as an address list. To fully describe how the present invention synchronizes an email client program on a desktop personal computer system with an email client program on a portable computer system, a detailed description is provided with reference to FIGS. 2a, 2b, and 3.

Figure 2A:
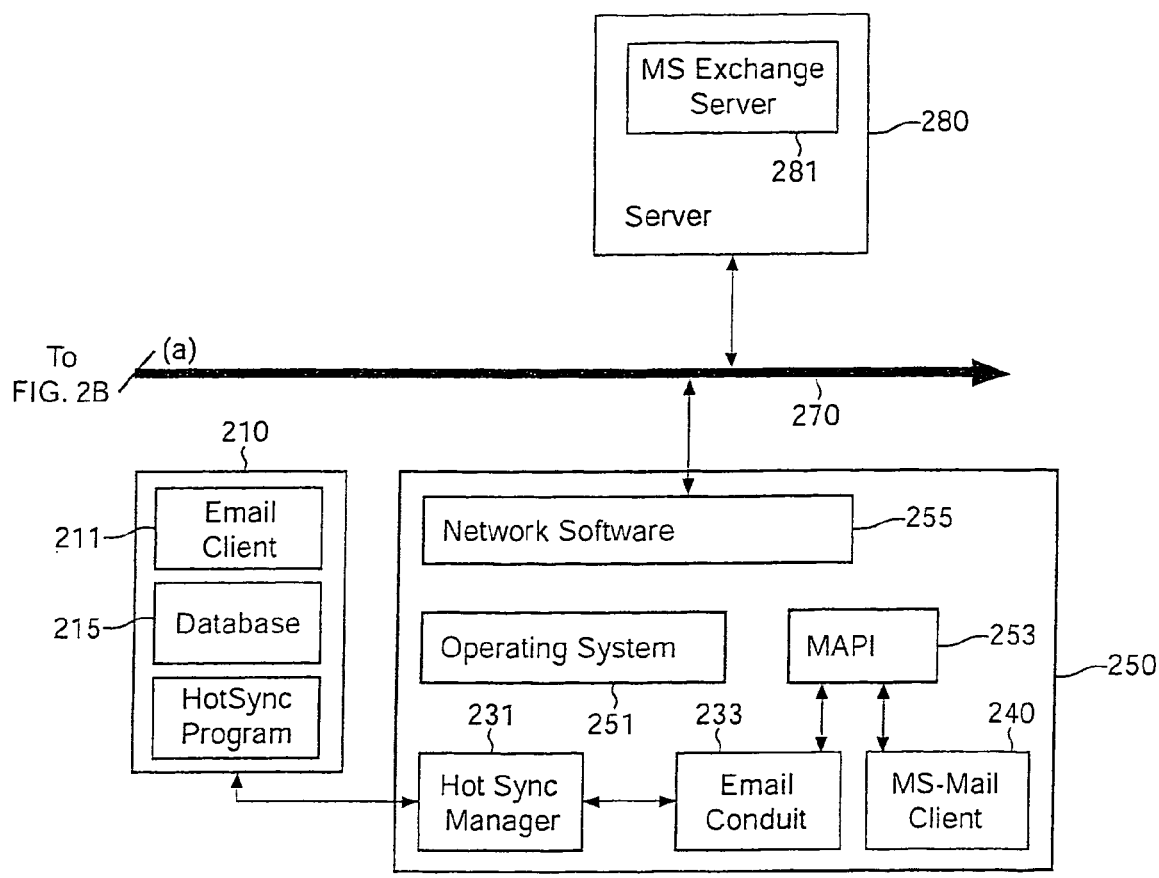
FIG. 2a illustrates a block diagram that depicts the software architecture for synchronizing email on the portable computer system with email on the desktop personal computer system using the Microsoft® MAPI protocol.

FIG. 2a illustrates the general software architecture for synchronizing an email client program on a desktop personal computer system with an email client program on a portable computer system. In the example of FIG. 2a, the email client program on the personal computer uses the Microsoft MAPI protocol. However, other email protocols may also be used as will be described later.

FIG. 2a illustrates a portable computer system 210 having an email client program 211. The email client program 211 works with email records stored in the database 215. The email client program 211 allows the user to view received email stored in the database 215. The email client program 211 also allows the user to compose new email messages to be sent to other computer users.

The portable computer system requires a connection to a computer network infrastructure to receive new email and to send newly composed email messages. To connect with the computer network infrastructure, this document describes a synchronization environment wherein the portable computer is coupled to a personal computer using a serial link as depicted in FIGS. 1a, 1b, and 2a. However, many other methods of connecting the portable computer system to a personal computer system as described in the patent application "Method And Apparatus For Synchronizing A Portable Computer System With A Desktop Computer System" filed on May 25, 1999, with Ser No. 09/318,404, now U.S. Pat. No. 6,330,618.

To update the email records stored in database 215, the user can place the portable computer system 210 into a cradle coupled to a personal computer through a serial link. The user presses a syncrhonization button on the cradle to activate a HotSync Program 217 on the portable computer system 210. The HotSync Program 217 on the portable computer system 210 communicates through the serial link with a HotSync Manager Program 231 on the personal computer system. The HotSync Manager Program 231 executes a number of conduit programs to synchronize databases including an email conduit program 233 to synchronize the email information.

To synchronize the email records from the portable computer system, the email conduit 233 communicates with a MAPI software layer 253 in the operating system software of the personal computer 250. The MAPI software layer 253 provides a limited set of routines for manipulating email on an email server. Detailed information about the MAPI software layer can be found in the Microsoft Developer Network documents published by the Microsoft Corporation.

Referring to FIG. 2a, a MAPI-compliant email server 280 is connected to a computer network 270 that is also coupled to the personal computer system 250. To access the email information on the MAPI-compliant email server 280, an application program on the personal computer 250 can issue MAPI compliant requests to the MAPI software layer 253. The MAPI software layer 253 transmits a request packet across the computer network 270 to the MAPI compliant email server 280. In response to the properly formatted MAPI requests, the MAPI-compliant email server 280 sends information back to the MAPI software layer 253.

For example, the Microsoft Mail email client program 240 on the personal computer system can send and receive email by issuing requests to the MAPI software layer 253. The MAPI software layer 253 transmits the requests through the appropriate network software to the MAPI-compliant email server software 281 on a server 280. The MAPI-compliant email server software responds through the network 270 back to the MAPI layer and thus back to the mail client software 240.

To send and received email, the email conduit 233 uses the same infrastructure. Thus, the email conduit 233 also makes requests to the MAPI software layer 253. The MAPI software layer 253 transmits the requests from the email conduit 233 through the appropriate network software to the MAPI-compliant email server software 281 on server 280.

It should be noted that the email server software 281 on server 280 maintains the email "state" for each user that the email server services. Specifically, the email server software maintains a set of active email messages for each user. By communicating through the MAPI software layer 253, the email conduit 233 can synchronize the email records on the portable computer system 210 with the email information on email server software 281 on server 280.

Figure 3:
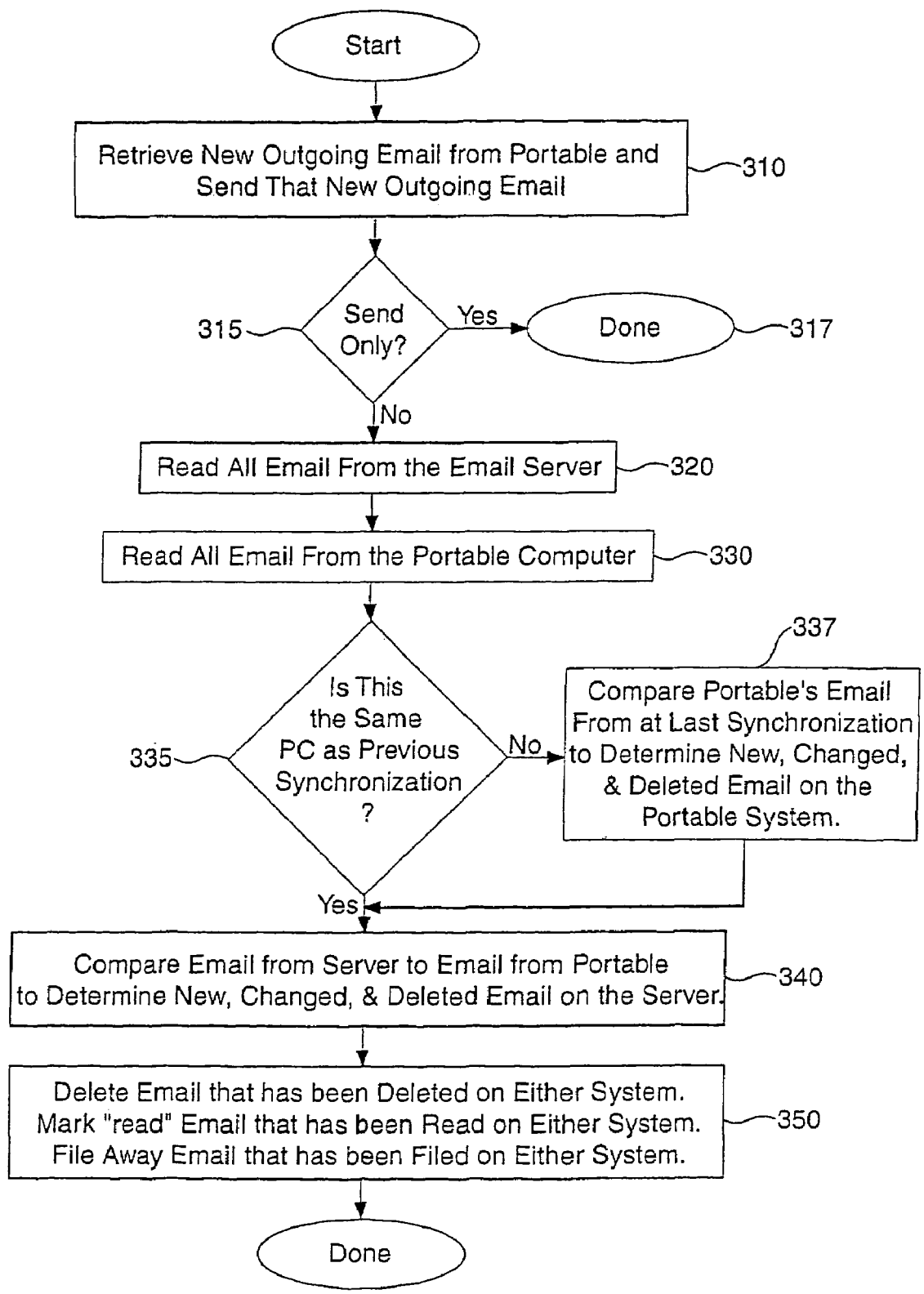
FIG. 3 illustrates a flow diagram that describes how email on the desktop personal computer system is synchronized with email on the portable computer system.

FIG. 3 illustrates a flow diagram that describes how the email client conduit 233 on the personal computer system 250 synchronizes the email state on the portable computer system 210 and the personal computer system 250. First, at step 310, the email conduit 233 retrieves all the outgoing email from the portable computer system 210. This outgoing email is sent to the email server software 281 using MAPI commands such that the outgoing email is sent to the desired recipient. At step 315, the email conduit determines if the user has selected a "send-only" mode. The send-only mode allows the user to shorten synchronization sessions by only sending outgoing email. If the user has selected the send-only mode the email client is done and stops at step 317. Otherwise the email conduit continues to synchronize the email in database 215 with the email on the email server software 281.

At step 320, the email conduit 233 reads all the email for the user from the email server 281. If the email conduit 233 cannot read the email from the server then the conduit will terminate since it cannot obtain the information necessary for the synchronization. After reading all the email from the email server 281 the email conduit 233 then reads all the email stored in the database 215 in the portable computer system at step 330.

At step 335, the email conduit 233 checks to see if this is a synchronization with the same personal computer that was used to perform the previous synchronization. If this is the same personal computer, then the email from the portable computer system will have valid status flags that specify the new, changed and deleted email from the portable computer system. However, if this is not the same personal computer that was used in the previous synchronization then the conduit proceeds to step 337 where it compares the email from the portable computer system with the email from the last synchronization to determine the new, changed and deleted email from the portable computer system. Additional information about the system of using a state from a previous synchronization is available in the U.S. patent application entitled "Method and Apparatus for Synchronizing Information on Two Different Computer Systems" with Ser. No. 08/544,927, filed on Oct. 18, 1995 now U.S. Pat. No. 5,727,202.

Next, at step 340, the email from the email server 281 is compared with the email retrieved from the portable to determine the new, changed and deleted email from the email server 281. After this step the email that is new, changed or deleted from the email server 281 is available.

The final step is then to synchronize the email information from the email server 281 and the email information from the portable computer system. To accomplish this goal, the email conduit 233 uses the list of the new, changed and deleted email from the portable computer system and the list of the new, changed and deleted email from the email server 281. Specifically, the list of the new, changed and deleted email from the portable computer system is used to modify the email on the email server 281 and the list of the new, changed and deleted email from the email server 281 is used to modify the email information on the portable computer system. Thus, at step 350, if an email message has been deleted from the email server 281 then that email message is deleted from the email list on the portable computer system. Similarly, if an email message has been deleted from the then that email message is deleted from the email server 281 email list on the portable computer system. If an email message has been modified on either system then that email message is modified on the other system. For example, if email has been marked as read on either system then the email is marked as read on the other system. Finally, if new email has been received by the email server 281, then that new email is copied into the database in the portable computer system.

Figure 2B:
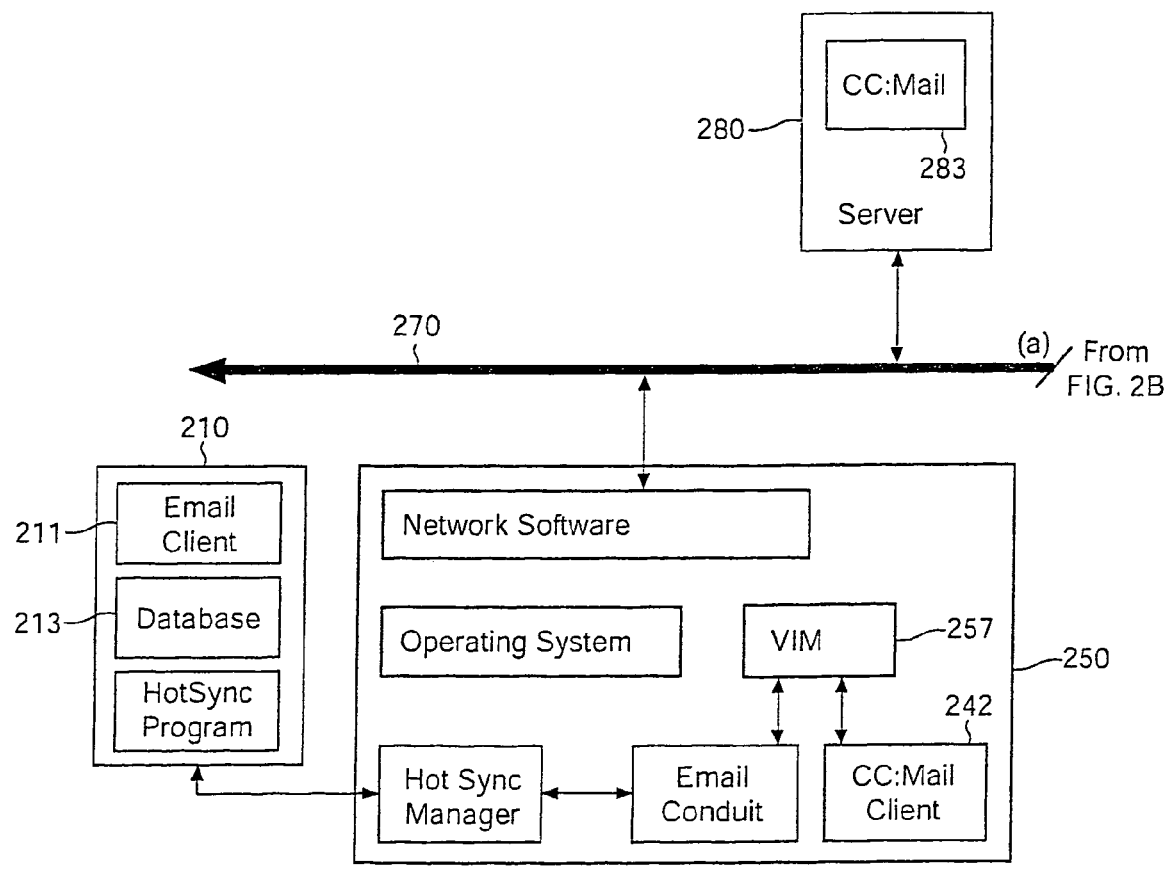
FIG. 2b illustrates a block diagram that depicts the software architecture for synchronizing email on the portable computer system with email on the desktop personal computer system using the Lotus® VIM protocol.

The techniques illustrated with reference to the MAPI based email system of FIG. 2a can be used in other email systems. For example, FIG. 2b illustrates a similar mail arrangement. In FIG. 2b, the server 280 is running the Lotus® cc:mail server software 283 on the server 280. To communicate with the Lotus® cc:mail server software, a VIM software layer 257 is placed in the system software of the personal computer system 250. The VIM software layer 257 is used by the Lotus® cc:mail client program 242. Since the VIM and MAPI software layers are very similar, the same method described in FIG. 3 can be used to synchronize email on systems use the VIM protocol.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A computer-readable storage medium carrying one or more sequences of instructions for synchronizing email between multiple computers, wherein execution of the one or more sequences of instructions by one or more processors causes the one or more processors to perform a method comprising the steps of:
   reading a first set of messages from a portable electronic device into a first personal computer;
   identifying an outgoing message in the first set of messages to be delivered from the first personal computer to a mail server;
   identifying on the first personal computer a second set of messages previously retrieved from a server, the second set of messages having, at least once prior to a previous event, a first message that matched a corresponding message in the first set of messages;
   comparing the first set of messages with the second set of messages to identify if at least the corresponding message in the first set of messages that matched the first message in the second set of messages was deleted or modified after the previous event; and
   automatically signaling the outgoing message to the mail server.

2. The computer-readable storage medium of claim 1, wherein the second set of messages include flags to identify whether each message in the second set of messages was added to or deleted from the second set of messages since a previous event.

3. The computer-readable storage medium of claim 1, the steps further comprising identifying if any messages in the second set of messages were modified on the first personal computer after the previous event, then replacing select messages in the first set of messages with the modified messages.

4. The computer-readable storage medium of claim 1, the steps further comprising causing the first message in the second set of messages to be deleted from the second set of messages if the corresponding message has been deleted from the first set of messages since the previous event.

5. The computer-readable storage medium of claim 1, the steps further comprising causing the first message in the second set of messages to be modified if the corresponding message has been modified on the portable electronic device since the previous event.

6. The computer-readable storage medium of claim 1, the steps further comprising comparing the first set of messages to the second set of messages to identify if the second set of messages includes at least a first new message added to the second set of messages after the previous event.

7. The computer-readable storage medium of claim 6, the steps further comprising adding the first new message to the first set of messages, then signaling the first set of messages to the portable electronic device.

8. The computer-readable storage medium of claim 1, the steps further comprising signaling the first set of messages to the portable electronic device after comparing the first set of messages and the second set of messages.

9. A computer-readable storage medium carrying one or more sequences of instructions for synchronizing email on two computer systems, wherein execution of the one or more sequences of instructions by one or more processors causes the one or more processors to perform a method comprising the steps of:
   reading a first set of email messages from a portable electronic device;
   reading a second set of email messages from an email server;
   comparing, on a second computer, said second set of email messages to said first set of email messages to determine new and deleted messages in said second set of email messages since a previous synchronization;
   adding new messages from said second set of email messages to said first set of email messages;
   deleting messages in said first set of email messages that were deleted from said second set of email messages;
   identifying an outgoing message in the first set of email messages; and
   sending the outgoing message to an intended recipient from an email application on the second computer.

10. The computer-readable storage medium of claim 9, wherein said first set of email messages from said portable electronic device include flags that determine if said email messages are new, modified, or deleted since the previous synchronization.

11. The computer-readable storage medium of claim 10, the steps further comprising the steps of:
   adding new messages from said first set of email messages to said second set of email messages; and
   deleting messages in said second set of email messages that were deleted from said first set of email messages.

12. The computer-readable storage medium of claim 9, the steps further comprising the step of:
   comparing said first set of email messages from said portable electronic device with a third set of email messages from the previous synchronization to determine new, modified, and deleted email messages in said first set of email messages since the previous synchronization.

13. The computer-readable storage medium of claim 12, the steps further comprising the steps of:
   adding new messages from said first set of email messages to said second set of email messages; and
   deleting messages in said second set of email messages that were deleted from said first set of email messages.

14. A computer-readable storage medium carrying one or more sequences of instructions for exchanging data between a portable electronic device and a second computer, wherein execution of the one or more sequences of instructions by one or more processors causes the one or more processors to perform a method comprising the steps of:
   receiving, on the second computer, a first signal from the portable electronic device to exchange data with the portable electronic device;
   in response to the first signal, synchronizing a first set of messages on the portable electronic device with a second set of messages on the second computer;
   receiving, on the second computer, a second signal from the portable electronic device to send data from the portable electronic device through the second computer to an intended recipient;
   in response to the second signal, receiving the data from the portable electronic device; and
   sending the data to the intended recipient; and
   wherein the step of receiving the data from the portable electronic device is performed concurrently with the step of synchronizing a first set of messages on the portable electronic device with a second set of messages on the second computer.

15. The computer-readable storage medium of claim 14, wherein the step of synchronizing a first set of messages on the portable electronic device includes synchronizing the first set of messages over a first communication connection between the portable electronic device and the second computer.

16. The computer-readable storage medium of claim 15, wherein the step of receiving the data from the portable electronic device includes receiving the data over a second communication connection.

17. The computer-readable storage medium of claim 14, wherein the step of sending the data to the intended recipient includes sending an email message composed on the portable electronic device.

18. The computer-readable storage medium of claim 17, wherein the step of sending an email message includes using an email program that operates under a Messaging Application Programming Interface (MAPI) protocol.

19. The computer-readable storage medium of claim 14, wherein the step of synchronizing a first set of messages on the portable electronic device with a second set of messages on the second computer includes detecting that a user deleted a message that exists in one of the first set of messages or the second set of messages, and then deleting that message from the one of the first set of messages or the second set of messages.

20. The computer-readable storage medium of claim 14, wherein the step of synchronizing a first set of messages on the portable electronic device with a second set of messages on the second computer includes detecting that a user altered a message from one of the first set of messages or the second set of messages, and then altering that message on the other one of the first set of messages or the second set of messages.

21. The computer-readable storage medium of claim 14, wherein the step of synchronizing a first set of messages on the portable electronic device with a second set of messages on the second computer includes determining that a new message exists on one of the portable electronic device or the second computer, and adding that message to the other of the portable electronic device or second computer.

22. The computer-readable storage medium of claim 14, wherein the step of receiving the data from the portable electronic device includes receiving at least a part of an email message for the intended recipient, and wherein the method further comprises inspecting the email message before sending the email message to the intended recipient.

23. A computer-readable storage medium carrying one or more sequences of instructions for exchanging data between a portable electronic device and a second computer, wherein execution of the one or more sequences of instructions by one or more processors causes the one or more processors to perform a method comprising the steps of:

receiving, on the second computer, a first signal from the portable electronic device to exchange data with the portable electronic device;

in response to the first signal, synchronizing a first set of messages on the portable electronic device with a second set of messages on the second computer;

receiving, on the second computer, a second signal from the portable electronic device to send data from the portable electronic device through the second computer to an intended recipient;

in response to the second signal, receiving the data from the portable electronic device; and sending the data to the intended recipient;

wherein the step of synchronizing a first set of messages on the portable electronic device includes synchronizing the first set of messages over a first communication connection between the portable electronic device and the second computer;

wherein the step of receiving the data from the portable electronic device includes receiving the data over a second communication connection; and wherein the first communication connection is different than the second communication connection.

24. The computer-readable storage medium of claim 23, wherein the step of receiving the data from the portable electronic device is performed concurrently with the step of synchronizing a first set of messages on the portable electronic device with a second set of messages on the second computer.

25. The computer-readable storage medium of claim 23, wherein the step of sending the data to the intended recipient includes sending an email message composed on the portable electronic device.

26. The computer-readable storage medium of claim 23, wherein the step of sending an email message includes using an email program that operates under a Messaging Application Programming Interface (MAPI) protocol.

27. The computer-readable storage medium of claim 23, wherein the step of synchronizing a first set of messages on the portable electronic device with a second set of messages on the second computer includes detecting that a user deleted a message that exists in one of the first set of messages or the second set of messages, and then deleting that message from the one of the first set of messages or the second set of messages.

28. The computer-readable storage medium of claim 23, wherein the step of synchronizing a first set of messages on the portable electronic device with a second set of messages on the second computer includes detecting that a user altered a message from one of the first set of messages or the second set of messages, and then altering that message on the other one of the first set of messages or the second set of messages.

29. The computer-readable storage medium of claim 23, wherein the step of synchronizing a first set of messages on the portable electronic device with a second set of messages on the second computer includes determining that a new message exists on one of the portable electronic device or the second computer, and adding that message to the other of the portable electronic device or second computer.

30. The computer-readable storage medium of claim 23, wherein the step of receiving the data from the portable electronic device includes receiving at least a part of an email message for the intended recipient, and wherein the method further comprises inspecting the email message before sending the email message to the intended recipient.

31. A computer-readable storage medium carrying one or more sequences of instructions for synchronizing email between multiple electronic devices, wherein execution of the one or more sequences of instructions by one or more processors causes the one or more processors to perform a method comprising the steps of:

a certain computer identifying from among a first set of messages on a portable electronic device an outgoing message addressed to a recipient;

said certain computer identifying a second set of messages on a mail server, the second set of messages having, at least once prior to a previous event, a first message that matched a corresponding message in the first set of messages, said mail server residing on computer different than said certain computer and said portable electronic device;

said certain computer automatically signaling the outgoing message to the mail server to cause said mail server to deliver said outgoing mail message to said recipient;

said certain computer making a comparison of the first set of messages with the second set of messages;

based on said comparison, said certain computer determining that the corresponding message was deleted or modified after the previous event; and in response to determining that the corresponding message was deleted or modified after the previous event, said certain computer sending a message to said mail server to cause said mail server to delete or modify said first message.

32. The computer-readable storage medium of claim 31, wherein the second set of messages include flags to identify whether each message in the second set of messages was added to or deleted from the second set of messages since the previous event.

33. The computer-readable storage medium of claim 31, the steps further comprising identifying if any messages in the second set of messages were modified on the certain computer after the previous event, then replacing corresponding messages in the first set of messages with the modified messages.

34. The computer-readable storage medium of claim 31, the steps further comprising comparing the first set of messages to the second set of messages to identify if the second set of messages includes at least a first new message added to the second set of messages after the previous event.

35. The computer-readable storage medium of claim 34, the steps further comprising adding the first new message to the first set of messages.

* * * * *